US009420621B2

(12) United States Patent
Chang et al.

(10) Patent No.: US 9,420,621 B2
(45) Date of Patent: *Aug. 16, 2016

(54) MOBILE COMMUNICATION METHOD, RADIO TERMINAL, AND BASE STATION

(71) Applicant: KYOCERA Corporation, Kyoto (JP)

(72) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,223

(22) Filed: Jun. 19, 2015

(65) Prior Publication Data

US 2015/0289311 A1 Oct. 8, 2015

Related U.S. Application Data

(63) Continuation of application No. 13/877,510, filed as application No. PCT/US2011/054807 on Oct. 4, 2011, now Pat. No. 9,100,858.

(60) Provisional application No. 61/389,395, filed on Oct. 4, 2010.

(51) Int. Cl.
*H04W 24/00* (2009.01)
*H04W 76/02* (2009.01)
(Continued)

(52) U.S. Cl.
CPC ........... *H04W 76/027* (2013.01); *H04L 41/069* (2013.01); *H04W 24/04* (2013.01); *H04W 76/046* (2013.01)

(58) Field of Classification Search
CPC ..... H04W 24/10; H04W 24/04; H04W 24/08; H04W 16/18; H04W 24/02; H04W 52/241; H04W 76/027; H04W 76/046; H04W 88/08; H04W 16/28; H04W 28/0236; H04W 28/04; H04W 36/0072; H04W 36/14; H04W 40/02; H04W 40/34; H04W 4/00; H04W 4/005; H04W 52/0209; H04W 24/00; H04W 24/06; H04W 52/0212; H04W 52/0216; H04W 72/005; H04W 72/04; H04W 72/0406; H04W 72/0413; H04W 72/042; H04W 72/044; H04W 72/0446; H04W 76/02; H04W 76/021; H04W 76/023; H04W 76/025; H04W 76/026; H04W 76/048; H04W 88/06; H04W 8/18; H04W 16/24; H04W 48/16; H04W 52/0206; H04W 64/00; H04W 72/048; H04W 72/085; H04L 12/2697

USPC ............ 455/423, 422.1, 456.1; 370/241, 225, 370/254

See application file for complete search history.

(56) References Cited

U.S. PATENT DOCUMENTS 7,043,265 B2 5/2006 Nir et al.
2003/0040869 A1 2/2003 Nir et al.
(Continued)

FOREIGN PATENT DOCUMENTS

JP 2006-203792 A 8/2006
JP 2009-016948 A 1/2009
(Continued)

OTHER PUBLICATIONS

Office Action dated Apr. 28, 2015 issued in counterpart Japanese patent Application No. 2014-098507.
(Continued)

*Primary Examiner* — Allahyar Kasraian
*Assistant Examiner* — B. M. M Hannan
(74) *Attorney, Agent, or Firm* — Procopio Cory Hargreaves and Savitch LLP

(57) ABSTRACT

A mobile communication method in which a radio terminal connects to a network so as to perform a communication, comprises: a step in which the radio terminal detects an occurrence of a connection failure with the network in a connected state; and a step of sending a radio link failure (RLF) report regarding the detected connection failure, from the radio terminal to the network. In the step of sending the RLF report, the radio terminal sends time information, which is contained in the RLF report, for identifying a time of occurrence of the connection failure, to the network.

3 Claims, 4 Drawing Sheets

(51) Int. Cl.
*H04W 76/04* (2009.01)
*H04W 24/04* (2009.01)
*H04L 12/24* (2006.01)

(56) References Cited

U.S. PATENT DOCUMENTS

| | | |
|---|---|---|
| 2008/0146219 A1 | 6/2008 | Habermas et al. |
| 2009/0135731 A1 | 5/2009 | Secades et al. |
| 2009/0257353 A1 | 10/2009 | Song et al. |
| 2010/0165836 A1 | 7/2010 | Wahlqvist et al. |
| 2010/0190488 A1 | 7/2010 | Jung et al. |
| 2011/0190016 A1 | 8/2011 | Hamabe et al. |
| 2011/0250880 A1* | 10/2011 | Olsson .......................... 455/423 |
| 2011/0300896 A1 | 12/2011 | Wang et al. |
| 2011/0312306 A1* | 12/2011 | Wu ....................... H04W 24/10 455/414.1 |
| 2012/0021746 A1 | 1/2012 | Wang et al. |
| 2012/0064886 A1* | 3/2012 | Kim et al. .................... 455/423 |

FOREIGN PATENT DOCUMENTS

| | | |
|---|---|---|
| JP | 2010-532111 A | 9/2010 |
| JP | 2012-518923 A | 8/2012 |
| WO | 2006-106921 A1 | 10/2006 |
| WO | 2009-022752 A1 | 2/2009 |
| WO | 2009-117443 A1 | 9/2009 |
| WO | 2010-017961 A1 | 2/2010 |
| WO | 2010-094236 A1 | 8/2010 |

OTHER PUBLICATIONS

Office Action dated Aug. 14, 2014 issued in counterpart Korean patent Application No. 22013-7009346.
Office Action dated Jan. 14, 2014 issued in counterpart Japanese Patent Application No. 2013-531946.
Office Action dated Jan. 14, 2014 issued in counterpart Japanese Patent Application No. 2013-531964.
International Search Report issued by USPTO for International Application No. PCT/US2011/054807.
Written Opinion of the International Searching Authority for International Application No. PCT/US2011/054807.
3GPP TS 36.300 V10.4.0 (Jun. 2011), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 2011.
3GPP TS 37.320 V10.1.0 (Mar. 2011), Technical Specification, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10), Mar. 2011.
3GPP TS 37.320 V1.0.0 (Aug. 2010), Technical Specification, 3rd Generation Partnership Project; Technical Specification Group TSG RAN, Universal Terrestrial Radio Access (UTRA) and Evolved Universal Terrestrial Radio Access (E-UTRA); Radio measurement collection for Minimization of Drive Tests (MDT); Overall description; Stage 2 (Release 10), Aug. 2010.
Office Action dated Sep. 3, 2013, issued in counterpart Japanese Application No. 2013-531964.
Catt, Consideration on Logged MDT Open Issues, 3GPP TSG RAN WG2 Meeting #69bis R2-102036, Apr. 12, 2010.
Office Action dated Oct. 6, 2015, issued in counterpart Japanese application No. 2015-153756.

* cited by examiner

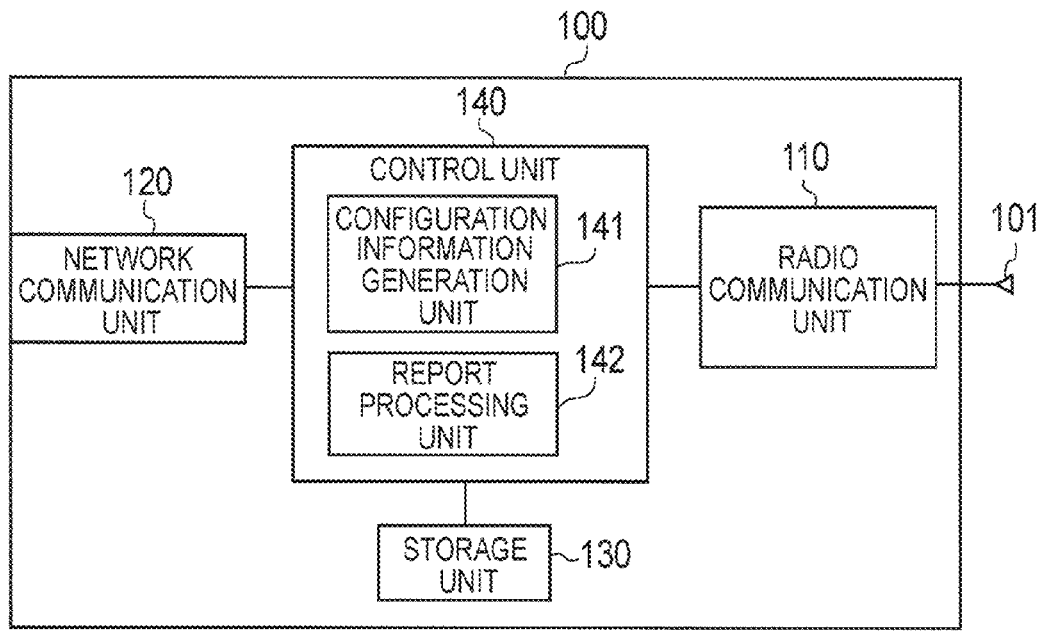
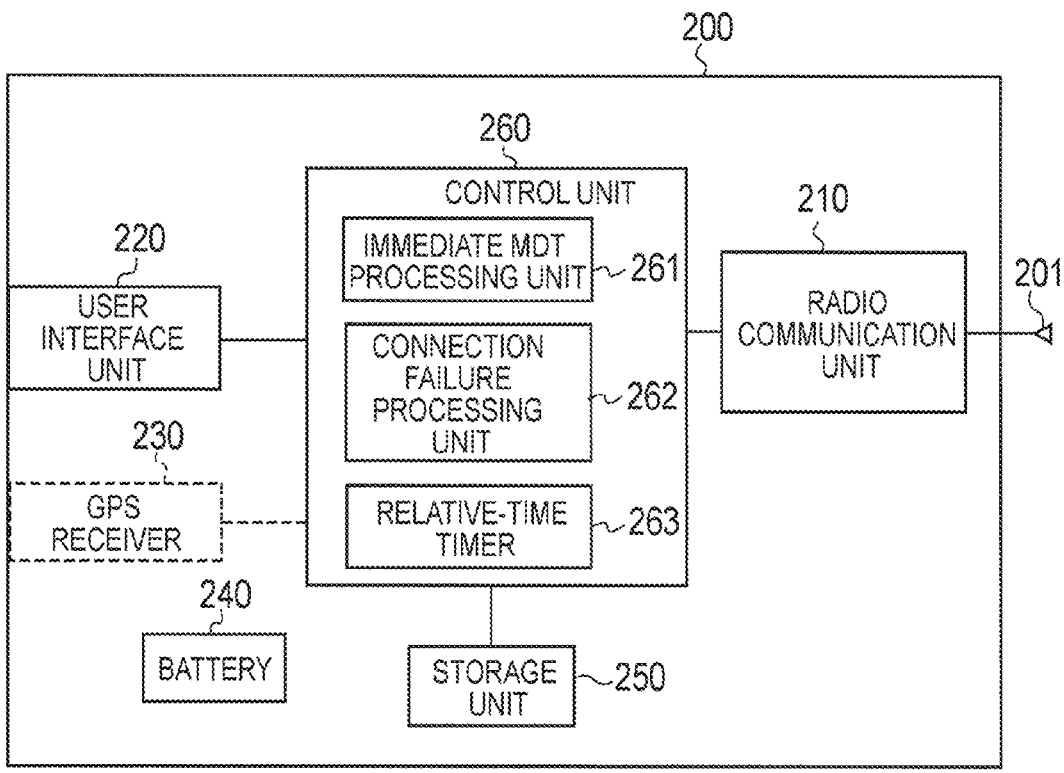

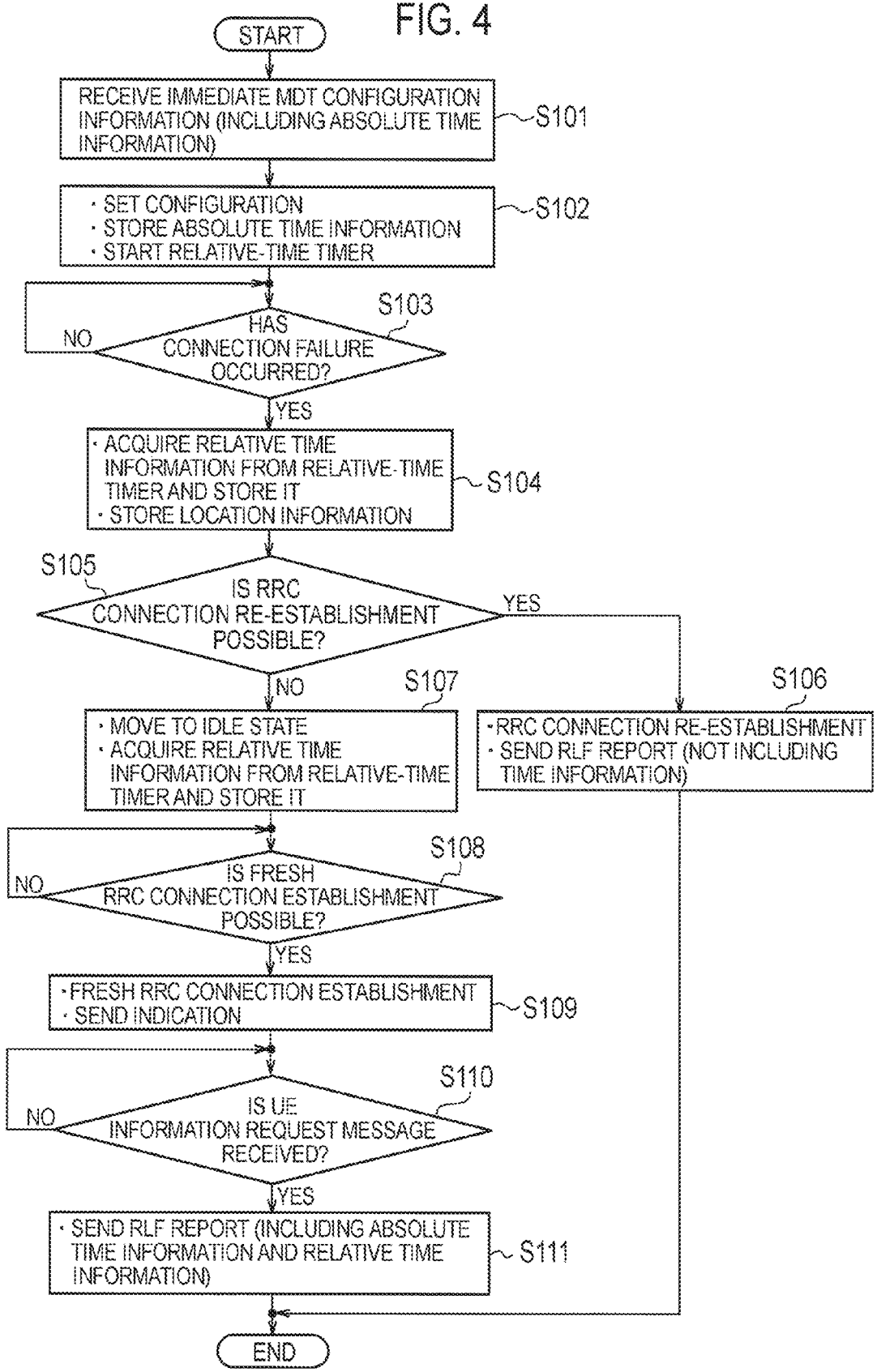

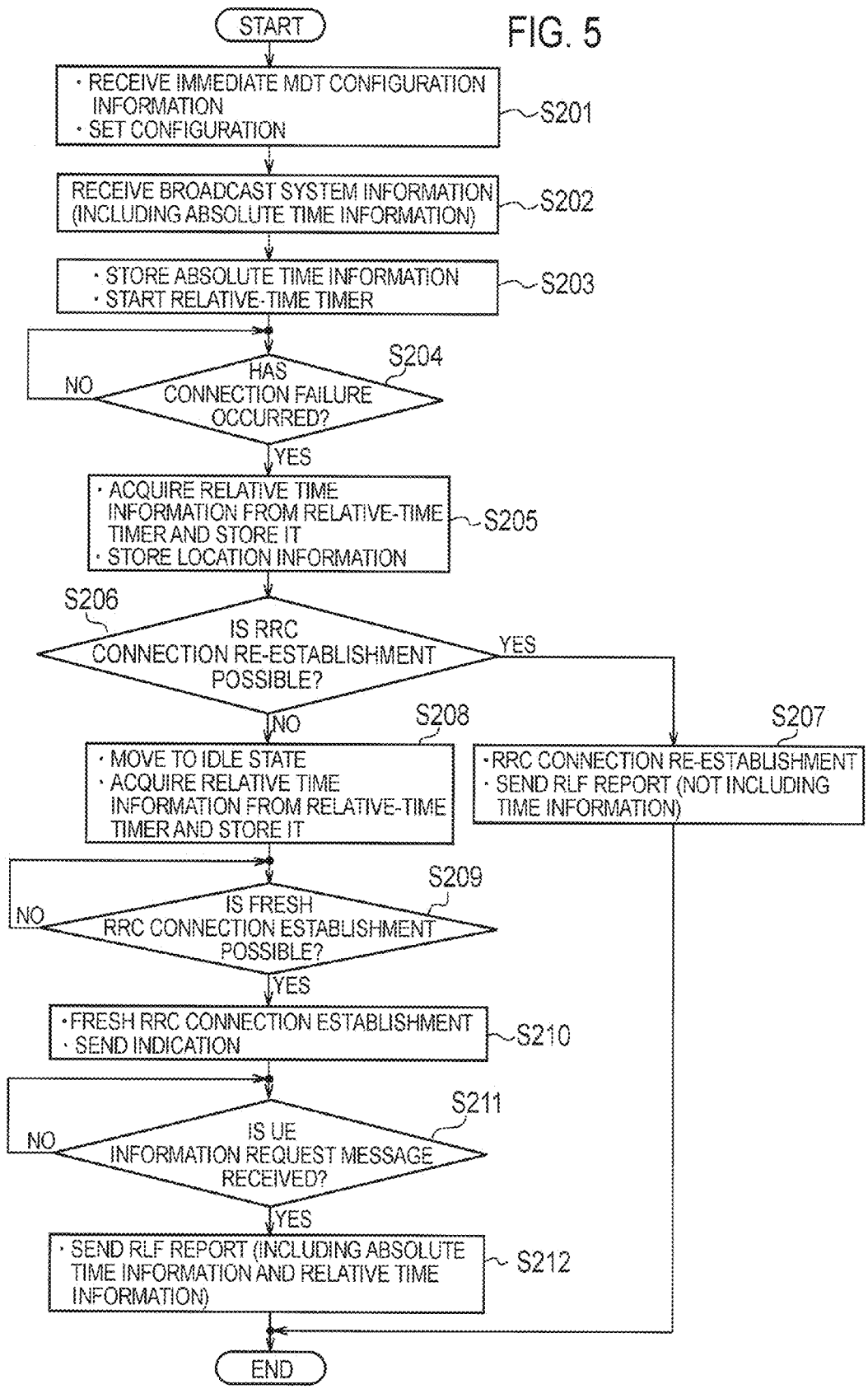

MOBILE COMMUNICATION METHOD, RADIO TERMINAL, AND BASE STATION

CROSS-REFERENCE TO RELATED APPLICATIONS

The present application is a continuation of U.S. application Ser. No. 13/877,510 filed on Apr. 3, 2013, which claims the benefit of PCT Application No. PCT/US2011/054807 filed on Oct. 4, 2011, which claims the benefit of Provisional Application No. 61/389,395 filed on Oct. 4, 2010. The contents of the above applications are incorporated herein by reference in their entirety.

TECHNICAL FIELD

The present invention relates to a mobile communication method, a radio terminal, and a base station handling a radio link failure (RLF) report.

BACKGROUND ART

In a mobile communication system, if a building is built in the vicinity of a base station, or if the installation status of a base station in the vicinity of the base station changes, the radio communication environment according to the base station changes. Therefore, conventionally, the operators make use of a measurement vehicle in which measurement equipment is loaded, and perform a drive test by measuring a state of a signal received from the network (base station), and then collecting the measurement data.

Such a measurement and collection process can, for example, contribute to the optimization of coverage of the base station, but faces the problem of too many man-hours and high cost. Thus, according to 3GPP (3rd Generation Partnership Project), i.e., a standardization project for mobile communication systems, a radio terminal belonging to the user is used to proceed with the specification planning of MDT (Minimization of Drive Test) for automation of the measurement and collection.

A type of MDT is the immediate report type MDT (referred to as "Immediate MDT"). According to Immediate MDT, a radio terminal in the connected state measures a reception signal state, and then reports the measurement results and location information during measurement to the network. The connected state refers to the state when the radio terminal is performing communications.

Furthermore, it is stipulated in the 3GPP standards that when a radio terminal in the connected state detects a connection failure with the network, a radio link failure (RLF) report about the connection failure is sent from the radio terminal to the network (see 3GPP TS 36.300 v10.4.0). A connection failure refers to RLF or a handover failure. Furthermore, it is stipulated that in Immediate MDT, the RLF report is extended, and the location information for identifying the location where the connection failure occurred is included in the RLF report (see 3GPP TS 37.320 v10.1.0).

Based on the Immediate MDT report and the RLF report received from the radio terminal, the network performs parameter adjustment (settings change) for coverage optimization.

SUMMARY OF THE INVENTION

A radio terminal cannot always send an RLF report about the connection failure to the network immediately after the occurrence of a connection failure is detected.

For example, in some cases, after the radio terminal switches from the connected state to the idle state due to a connection failure, the RLF report is sent when a connection is re-established with the network.

Furthermore, in some cases, the RLF report about a connection failure detected by a radio terminal in a particular RAT (Radio Access Technology) must be sent to the corresponding RAT. Therefore, immediately after the connection failure, the radio terminal connects to another RAT, and the RLF report is sent when the radio terminal connects again to the corresponding RAT.

In such cases, a long period of time may pass from the time of occurrence of a connection failure until the transmission of the RLF report. Therefore, after performing parameter adjustment for coverage optimization, the network would mistakenly receive the RLF report about the connection failure occurring before the adjustment of parameters, and wrong parameter adjustment may be induced.

Thus, the present invention provides a mobile communication method, a radio terminal, and a base station by which is it possible to prevent a network from performing a wrong parameter adjustment.

In order to solve the problems described above, the present invention has the following features.

According to a feature of a mobile communication method of the present invention, there is provided a mobile communication method in which a radio terminal (e.g. UE 200) connects to a network (e.g. E-UTRAN 10) so as to perform a communication, comprising: a step in which the radio terminal detects an occurrence of a connection failure with the network in a connected state; and a step of sending a RLF report regarding the detected connection failure, from the radio terminal to the network, wherein in the step of sending the RLF report, the radio terminal sends time information, which is contained in the RLF report, for identifying a time of occurrence of the connection failure, to the network.

According to another feature of a mobile communication method of the present invention, the mobile communication method further comprises a step in which the radio terminal restores to the connected state by re-establishing a connection to the network after moving to an idle state by the occurrence of the connection failure, wherein in the step of sending the RLF report, the radio terminal sends the time information that is contained in the RLF report, to the network, after restoring to the connected state in the restoring step.

According to another feature of a mobile communication method of the present invention, in the step of sending the RLF report, the radio terminal sends the time information, the location information for identifying a location of occurrence of the connection failure, which are contained in the RLF report, to the network.

According to another feature of a mobile communication method of the present invention, the mobile communication method further comprises a step in which the network configures Immediate MDT on the radio terminal in the connected state, wherein the step of configuring includes a step of sending absolute time information indicating a network time from the network to the radio terminal.

According to another feature of a mobile communication method of the present invention, the time information included in the RLF report includes the absolute time information received from the network and relative time information indicating a relative time of a time of occurrence of the connection failure relative to the network time.

According to another feature of a mobile communication method of the present invention, the mobile communication method further comprises: a step in which the network broadcasts the absolute time information indicating a network time; and a step in which the radio terminal receives the absolute time information broadcasted from the network.

According to another feature of a mobile communication method of the present invention, the time information included in the RLF report includes the absolute time information received from the network and relative time information indicating a relative time of a time of occurrence of the connection failure relative to the network time.

According to another feature of a mobile communication method of the present invention, the time information included in the RLF report is based only on the absolute time information received from the network without including relative time information.

According to a feature of a radio terminal of the present invention, there is provided a radio terminal configured to connect to a network so as to perform a communication, comprising: a detection unit (e.g. connection failure processing unit 262) configured to detect an occurrence of connection failure with the network, in a connected state; and a transmission unit (e.g. connection failure processing unit 262, radio communication unit 210) configured to send a radio link failure (RLF) report regarding the detected connection failure, to the network, wherein the transmission unit sends time information, which is contained in the RLF report, for identifying a time of occurrence of the connection failure to the network.

According to another feature of a radio terminal of the present invention, the radio terminal further comprises a storage unit, wherein the storage unit stores the RLF information that is information about the detected connection failure and that should be included in the RLF report, separately from other information.

According to a feature of a base station of the present invention, there is provided a base station (e.g. eNB 100) configured to configure Immediate MDT on a radio terminal in a connected state, comprising a transmission unit (e.g. configuration information generation unit 141, radio communication unit 110) configured to send absolute time information indicating a network time, to the radio terminal, when configuring the Immediate MDT.

According to another feature of a base station of the present invention, there is provided a base station, comprising a broadcast transmission unit (e.g. radio communication unit 110) configured to broadcast absolute time information indicating a network time.

BRIEF DESCRIPTION OF THE DRAWINGS

FIG. 2 is a block diagram of eNB (base station) according to the first and second embodiments.

FIG. 3 is a block diagram of UE (radio terminal) according to the first and second embodiments.

FIG. 4 is an operation flowchart of UE according to the first embodiment.

FIG. 5 is an operation flowchart of UE according to the second embodiment.

DESCRIPTION OF EMBODIMENTS

Figure 1:
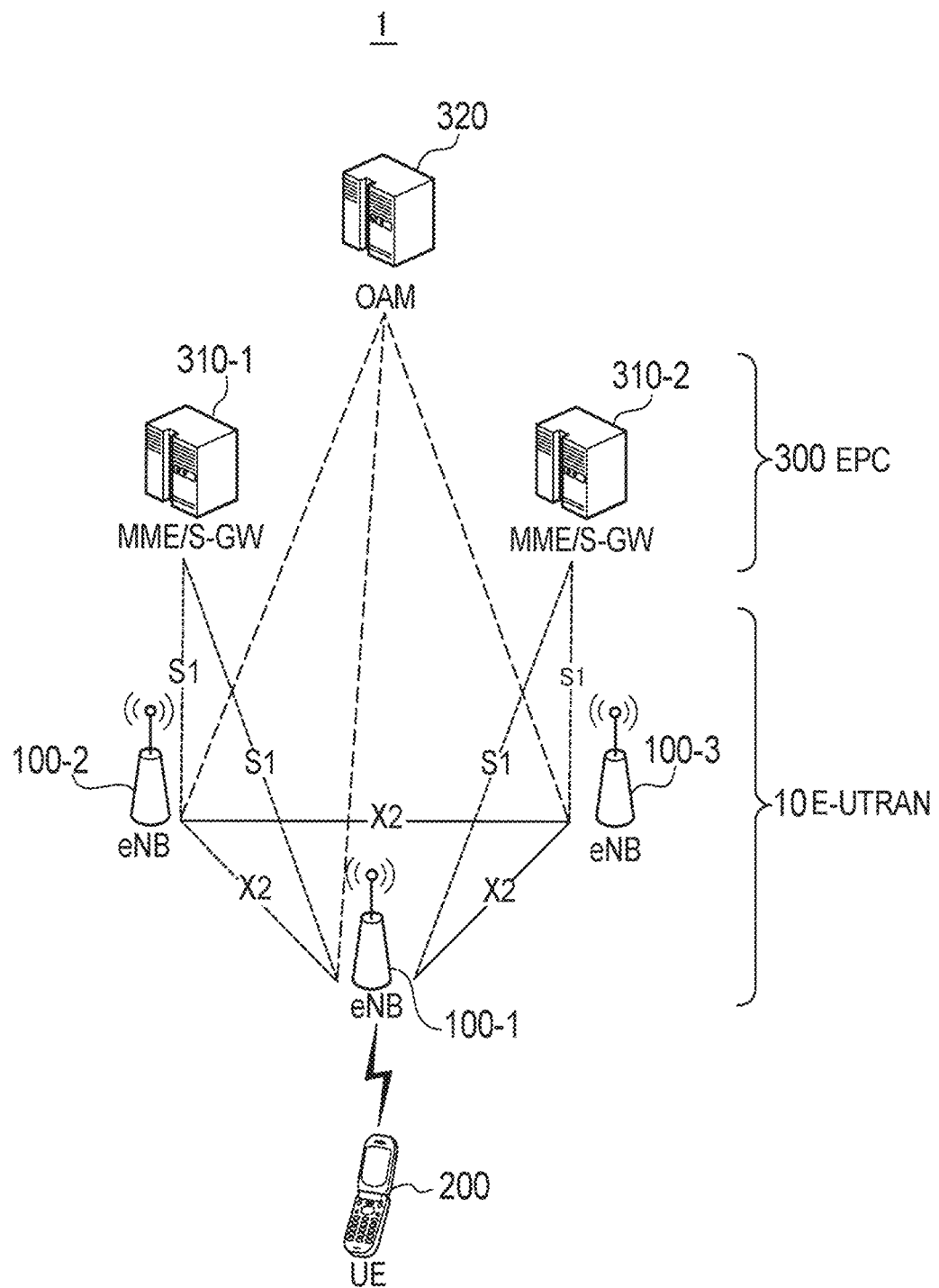
FIG. 1 is a diagram showing an entire configuration of a mobile communication system according to first and second embodiments.

A first embodiment, a second embodiment, and other embodiments of the present invention are explained below with reference to drawings. In the drawings of each of the embodiments shown below, the same or similar symbols have been used in the same or similar portions.

First Embodiment (Overview of Mobile Communication System)

FIG. 1 is a diagram showing an entire configuration of a mobile communication system 1 according to the present embodiment. The mobile communication system 1 according to the present embodiment is configured based on LTE (Long Term Evolution) or LTE-Advanced, whose specifications are stipulated in 3GPP, and supports the above-mentioned Immediate MDT.

As shown in FIG. 1, the mobile communication system 1 includes eNB (evolved Node-B) 100, UE (User Equipment) 200, MME (Mobility Management Entity)/S-GW (Serving Gateway) 310, and OAM (Operation and Maintenance) 320. In the present embodiment, the eNB 100 corresponds to a base station, and the UE 200 corresponds to a radio terminal.

A plurality of eNBs 100 configure E-UTRAN (Evolved-UMTS Terrestrial Radio Access Network) 10, which is the radio access network of LTE. In the present embodiment, E-UTRAN 10 corresponds to a network to which the UE 200 is connected.

Each eNB 100 is a fixed radio communication device set up by an operator, and is configured to perform radio communication with the UE 200. Each eNB 100 communicates with another adjoining eNB 100 on an X2 interface, and communicates with the MME/S-GW 310 on an S1 interface. Each eNB 100 forms one or more cells, which are the smallest units of the radio communication area. Each eNB 100 always broadcasts a reference signal that enables the identification of cells.

The UE 200 is a transportable radio communication device belonging to the user. The UE 200 is configured to connect to the eNB 100 included in the E-UTRAN 10, and to enable communication with the communication destination via the eNB 100. The state when the UE 200 is communicating with the communication destination is called the connected state, and the state when the UE 200 is waiting for communication is called the idle state. As a result of movement, the UE 200 switches the visiting cells. The cell switching performed when the UE 200 is in the connected state is called handover, and the cell switching performed when the UE 200 is in the idle state is called cell reselection.

MME is configured to perform different types of mobility management for the UE 200. S-GW is configured to perform transfer control of user data sent and received by the UE 200. A plurality of MME/S-GW5 310 configure EPC (Evolved Packet Core) 300, which is the core network of LTE. The OAM 320 is a server device set up by an operator, and is configured to perform maintenance and monitoring of the E-UTRAN 10.

Next, an overview of Immediate MDT is presented.

If necessary, the eNB 100 sends a Measurement Configuration information for performing Immediate MDT to a locally connected (in connected state) UE 200. The Immediate MDT configuration is actually part of SON-MRO and the request message is incorporated in the UEInformationRequest message; and in the UEInformationResponse message a location information can also be included as configured in the ReportConfigEUTRA IE.

The UE 200 that receives the Measurement Configuration information measures the state of a signal received from the connection-destination eNB 100 and the adjoining base stations in the connected state, and at the same time, transmits the measurement data containing the measurement results to the corresponding connection-destination eNB 100.

Note that the reception signal state refers to the reference signal received power (RSRP) and reference signal received quality (RSRQ), for example. In addition to the measurement results of the reception signal state, the measurement data includes the location information during measurement. The location information is GPS location information when the UE 200 has a GPS functionality, and is RF fingerprint information when the UE 200 does not have the GPS functionality.

The eNB 100 that receives the measurement data from the UE 200 adds the time information to the received measurement data, and transfers the measurement data with the added time information to the OAM 320. Based on the measurement data thus acquired, the OAM 320 detects the coverage problems, and either notifies the detected coverage problems to the operator, or performs network optimization for resolving the problems.

Next, an overview of an RLF report is presented.

In the connected state (RRC connected state), the UE 200 detects a connection failure with the eNB 100 included in the E-UTRAN 10, and attempts to re-establish a connection (RRC connection re-establishment) with the E-UTRAN 10.

If the UE 200 succeeds in re-establishing a connection with the E-UTRAN 10 (RRC connection re-establishment) while maintaining the connected state, it sends an RLF report about the connection failure to the connection-destination eNB 100.

On the contrary, if the UE 200 fails connection re-establishment (RRC connection re-establishment) with the E-UTRAN 10, it moves to the idle state, and records the information about the two connection failure. One for the connection failure while served by eNB 100, and another connection failure during re-establishment. Furthermore, at the time of connection establishment (fresh RRC connection establishment) with the E-UTRAN 10, the UE 200 sends an indication about the possibility of sending an RLF report to the connection-destination eNB 100. In the connected state, the UE 200 sends a response (UE Information Response) containing the RLF report to the connection-destination eNB 100 upon receiving a request (UE Information Request) from the connection-destination eNB 100.

In the present embodiment, when the UE 200 in which Immediate MDT is configured is restored to the connected state after it moves to the idle state following the occurrence of a connection failure, it sends the time information for identifying the time of occurrence of the connection failure by including it in the RLF report. The details of the corresponding time information are described later.

(Configuration of eNB 100)

Next, the configuration of the eNB 100 is explained. FIG. 2 is a block diagram of the eNB 100.

As shown in FIG. 2, the eNB 100 includes an antenna 101, a radio communication unit 110, a network communication unit 120, a storage unit 130, and a control unit 140.

The antenna 101 is used for sending and receiving radio signals. The radio communication unit 110 is, for example, configured by using a radio frequency (RF) circuit and a base band (BB) circuit, and sends and receives radio signals via the antenna 101. The network communication unit 120 is configured to perform communication with other network devices (MME/S-GW 310, OAM 320, and other eNB 100). The storage unit 130 is, for example, configured by using a memory, and stores different types of information used for controlling the eNB 100. The control unit 140 is, for example, configured by using a processor, and controls different types of functions of the eNB 100.

The control unit 140 includes a configuration information generation unit 141 configured to generate a Measurement Configuration information, and a report processing unit 142 configured to execute the processing for the report sent from the UE 200.

When the configuration information generation unit 141 determines that the UE 200 is to be used in Immediate MDT, it generates a Measurement Configuration information, and controls the radio communication unit 110 so as to send the Measurement Configuration information to the corresponding UE 200 in the connected state.

The Measurement Configuration information includes various measurement parameters. The measurement parameters include the measurement targets and report triggers. The measurement targets are RSRP and RSRQ, for example. Furthermore, a power head room (PHR) can also be considered as a measurement target. The report triggers are Periodic, for example, or when the RSRP of the serving cell is less than the threshold value. In the present embodiment, the Measurement Configuration information includes the absolute time information indicating the network time. In more details, the absolute time information is information in which the current network time when configuring Immediate MDT in the UE 200 is indicated in the YY-MM-DD HH:MM:SS format.

The report processing unit 142 is configured to acquire the Measurement report when the radio communication unit 110 receives the Measurement report containing the measurement data according to Immediate MDT from the UE 200. The corresponding measurement data includes the measurement results of RSRP, RSRQ, or PH, and also the location information during the measurement. The report processing unit 142 is configured to add time information to the measurement data included in the Measurement report, and controls the network communication unit 120 so as to transfer the measurement data with the added time information to the OAM 320. More particularly, the time information is information in which the current network time when acquiring the Measurement report according to Immediate MDT is indicated in the YY-MM-DD HH:MM:SS format. However, the report processing unit 142 is not limited to cases wherein the measurement data is transferred to the OAM 320, but can also be used for interpreting the contents of the measurement data, and for a parameter adjustment of the eNB 100 itself.

When the radio communication unit 110 receives an indication about the possibility of sending an RLF report from the UE 200, and when it is determined to acquire the RLF report based on the instruction from the OAM 320, or based on the judgment of the eNB 100 itself, the report processing unit 142 generates a UE Information Request message for acquiring the RLF report, and controls the radio communication unit 110 so as to send the UE Information Request message to the UE 200.

Furthermore, when the radio communication unit 110 receives a UE Information Response message containing the RLF report that is sent from the UE 200 in response to the UE Information Request message, the report processing unit 142 acquires the RLF report included in the received UE Information Response message. If the RLF report does not include the time information, the report processing unit 142 adds the time information to the RLF report, and controls the network communication unit 120 so as to transfer the RLF report with the added time information to the OAM 320 or to another eNB 100. If the RLF report includes the time information, the report processing unit 142 controls the network communication unit 120 so as to transfer the RLF report to the OAM 320 or to another eNB 100. Note that the report processing unit 142 is not limited to cases wherein the RLF report is transferred to the OAM 320 or to another eNB 100, but can also be used for interpreting the contents of the measurement data, and for parameter adjustment of eNB 100 itself.

(Configuration of UE 200)

Next, the configuration of the UE 200 is explained. FIG. 3 is a block diagram of the UE 200.

As shown in FIG. 3, the UE 200 includes an antenna 201, a radio communication unit 210, a user interface unit 220, a GPS receiver 230, a battery 240, a storage unit 250, and a control unit 260. However, the UE 200 need not include the GPS receiver 230.

The antenna 201 is used for sending and receiving radio signals. The radio communication unit 210 is, for example, configured by using a radio frequency (RF) circuit and base band (BB) circuit, and sends and receives radio signals via the antenna 201. The user interface unit 220 is a display, a button, or the like that functions as an interface with the user. The GPS receiver 230 generates the location information indicating the geographical location of the UE 200. The battery 240 is a chargeable battery, which accumulates the electric power to be supplied to each block of the UE 200.

The storage unit 250 is, for example, configured by using a memory, and stores different types of information used for controlling UE 200. The storage unit 250 is configured to store the RLF information that must be included in an RLF report, which is the information about a detected connection failure, separately from the other information. The other information, for example, refers to the normal measurement data or the like, which is acquired through Immediate MDT. Because the measurement data acquired through Immediate MDT is reported immediately, it may be temporally stored (buffered). On the other hand, the RLF information need not necessarily be reported immediately. Therefore, it is stored in a specific separate storage area for this purpose.

The control unit 260 is, for example, configured by using a processor, and controls different types of functions of the UE 200.

The control unit 260 includes an Immediate MDT processing unit 261 configured to perform the processing concerning Immediate MDT, a connection failure processing unit 262 configured to perform the processing concerning a connection failure, and a relative-time timer 263 configured to count the relative time concerning the connection failure. Here, the relative time refers to the relative time of the connection failure occurrence time with respect to the network time.

When the radio communication unit 210 receives the Measurement Configuration information according to Immediate MDT from the eNB 100, the Immediate MDT processing unit 261 sets (that is, stores in the storage unit 250) the measurement parameters included in the received Measurement Configuration information, in the connected state. The Immediate MDT processing unit 261 is configured to perform the measurement processing according to the measurement parameters stored in the storage unit 250, in the connected state. More particularly, the Immediate MDT processing unit 261 is configured to measure the targets specified as measurement targets among the measurement parameters, and to acquire the location information. Furthermore, the Immediate MDT processing unit 261 controls the radio communication unit 210 so as to send the Measurement report containing the measurement data (measurement results and location information) at the triggers specified as the report triggers among the measurement parameters to the eNB 100.

the present embodiment, the Measurement Configuration information according to Immediate MDT includes the absolute time information indicating the network time. When the radio communication unit 210 receives the Measurement Configuration information according to Immediate MDT from the eNB 100, the Immediate MDT processing unit 261 stores the absolute time information included in the Measurement Configuration information in the storage unit 250, and at the same time, starts the relative-time timer 263. The relative-time timer 263 counts the time after being started, in units of one second, for example.

The connection failure processing unit 262 detects a connection failure in the connected state. For example, when the connection failure processing unit 262 detects a Radio Problem in the connected state, and does not recover within the predetermined time (T1) after detecting the Radio Problem, it is determined that RLF has occurred. When the connection failure processing unit 262 detects a connection failure, it acquires the relative time counted by the relative-time timer 263. Furthermore, the connection failure processing unit 262 attempts a connection re-establishment (RRC connection re-establishment) within the predetermined time (T2) after detecting a connection failure.

If the connection failure processing unit 262 is successful in connection re-establishment (RRC connection re-establishment) within the predetermined time (T2) after detecting a connection failure, it controls the radio communication unit 210 so as to send an RLF report to the reconnection-destination eNB 100 (cell) according to the current specifications. If Immediate MDT has been configured, the connection failure processing unit 262 performs control so as to send the location information indicating the location where the connection failure was detected by including it within the RLF report.

On the contrary, in the case of failure in connection re-establishment (RRC connection re-establishment) within the predetermined time (T2) after detecting a connection failure, the UE 200 moves to the idle state. In such a case, the connection failure processing unit 262 stores, for each of the failures, the information about the connection failure (hereinafter referred to as "RLF information"), the location information indicating the location where the connection failure was detected, and the relative time information indicating the relative time counted by the relative-time timer 263 in the storage unit 250. The each RLF information includes the ID of the cell concerning the connection failure (E-CGI), the ID of the cell to which the connection re-establishment (RRC connection re-establishment) was attempted (E-CGI), the information about the type of the connection failure (RLF or handover failure), and the radio measurement information.

After the UE 200 moves to the idle state due to the connection failure, the connection failure processing unit 262 controls the radio communication unit 210 so as to send an indication about the possibility of sending an RLF report to the connection-destination eNB 100, at the time of connection establishment (fresh RRC connection establishment), included in the E-UTRAN 10, with the eNB 100. When the radio communication unit 210 receives the UE Information Request message sent from the eNB 100 in response to the indication, the connection failure processing unit 262 acquires, for each of the failures, the RLF information stored, the location information, the absolute time information, and the relative time information in the storage unit 250, generates an RLF report including the each RLF information, location information, absolute time information, and relative time information, and controls the radio communication unit 210 so as to send the RLF report to the eNB 100 by including it within a UE Information Response message.

(Operation of UE 200)

The operation of the UE 200 according to the present embodiment is explained below. FIG. 4 is an operation flowchart of the UE 200 according to the present embodiment. In the initial state of FIG. 4, the UE 200 is assumed to be in the connected state (RRC connected state).

In step S101, the radio communication unit 210 receives the Measurement Configuration information according to Immediate MDT from the serving cell. As described above, in the present embodiment, the Measurement Configuration information includes the absolute time information indicating the network time.

In step S102, the Immediate MDT processing unit 261 stores the measurement parameters included in the Measurement Configuration information in the storage unit 250. Furthermore, the Immediate MDT processing unit 261 stores the absolute time information included in the Measurement Configuration information in the storage unit 250, and at the same time, starts the relative-time timer 263.

In step S103, the connection failure processing unit 262 determines whether or not a connection failure has occurred. If the connection failure processing unit 262 detects that a connection failure has occurred (step S103; YES), the processing proceeds to step S104.

In step S104, when the connection failure processing unit 262 detects a connection failure, it generates first RLF information, acquires first relative time counted by the relative-time timer 263, and stores the first RLF information and the first relative time information in the storage unit 250. Furthermore, the connection failure processing unit 262 stores first location information indicating the location where the first connection failure was detected in the storage unit 250.

In step S105, the connection failure processing unit 262 determines whether or not connection re-establishment (RRC connection re-establishment) is possible within the predetermined time (T2) after detecting a connection failure.

If the connection re-establishment (RRC connection re-establishment) is possible within the predetermined time (T2) after detecting a connection failure (step S105; YES), the connection failure processing unit 262 performs connection re-establishment (RRC connection re-establishment) in step S106. Furthermore, the connection failure processing unit 262 acquires the first RLF information and the first location information from the storage unit 250, and controls the radio communication unit 210 so as to send an RLF report containing the first RLF information and first location information to the reconnection-destination cell.

On the other hand, if the connection re-establishment (RRC connection re-establishment) is not possible within the predetermined time (T2) after detecting a connection failure (step S105; NO), the UE 200 moves to the idle state (RRC idle state) in step S107. Furthermore, the connection failure processing unit 262 generates second RLF information, acquires second relative time information from the relative-time timer 263, and stores the second RLF information and second relative time information in the storage unit 250. Furthermore, the connection failure processing unit 262 stores second location information indicating the location where the second connection failure was detected in the storage unit 250.

In step S108, the connection failure processing unit 262 determines if connection establishment (fresh RRC connection establishment) with the cell included in the E-UTRAN 10 is possible. If the connection establishment (fresh RRC connection establishment) with the cell included in the E-UTRAN 10 is possible (step S108; YES), the processing proceeds to step S109.

In step S109, the connection failure processing unit 262 performs connection establishment (fresh RRC connection establishment) with the cell included in the E-UTRAN 10, and returns to the connected state. Furthermore, the connection failure processing unit 262 controls the radio communication unit 210 so as to send an indication about the possibility of sending an RLF report to the connection-destination cell.

In step S110, the connection failure processing unit 262 determines if the radio communication unit 210 has received a UE Information Request message from the connection-destination cell. If the radio communication unit 210 has received the UE Information Request message from the connection-destination cell (step S110; YES), the processing proceeds to step S111.

In step S111, the connection failure processing unit 262 acquires the first and second RLF information, the first and second location information, the absolute time information, and the first and second relative time information stored in the storage unit 250, generates an RLF report including the first and second RLF information, first and second location information, absolute time information, and first and second relative time information, and controls the radio communication unit 210 so as to send the RLF report, while it is included within a UE Information Response message, to the eNB 100.

(Summary of the First Embodiment)

As described above, the UE 200 detects the occurrence of a connection failure with the E-UTRAN 10, and sends an RLF report about the detected connection failure to the E-UTRAN 10. The UE 200 includes the time information for identifying the time of occurrence of the connection failure in the RLF report, and sends it to the E-UTRAN 10. This enables the E-UTRAN 10 and OAM 320 to understand that the RLF report relates to a connection failure that has occurred at a particular time, and therefore, the execution of a wrong parameter adjustment can be prevented.

In the present embodiment, after the UE 200 moves to the idle state due to the occurrence of a connection failure, it returns to the connected state by re-establishing a connection with the E-UTRAN 10. After returning to the connected state, the UE 200 includes the time information in the RLF report, and sends it to the E-UTRAN 10. When an RLF report is sent during the re-establishment of a connection with the E-UTRAN 10 after the UE 200 moves from the connected state to the idle state due to a connection failure, a long period of time may elapse from the time of occurrence of the connection failure until the RLF report is sent. Thus, in such cases, by including the time information in the RLF report, the execution of a wrong parameter adjustment by the E-UTRAN 10 and OAM 320 can be prevented.

In the present embodiment, the UE 200 includes the time information as well as the location information for identifying the location of occurrence of the connection failure in the RLF report, and sends it to the E-UTRAN 10. This enables the E-UTRAN 10 and OAM 320 to understand that the received RLF report relates to a connection failure that has occurred at a particular time and location.

In the present embodiment, the absolute time information indicating the network time is sent from the E-UTRAN 10 to the UE 200, when the E-UTRAN configures Immediate MDT for the UE 200 in the connected state. Thus, the absolute time information can be sent to the UE 200 in the configuration procedure of Immediate MDT, and therefore, the UE 200 can acquire the absolute time information only by making a few changes to the existing procedure.

In the present embodiment, the time information included in the RLF report includes the absolute time information received from the E-UTRAN 10, and the relative time information indicating the relative time of the time of occurrence of the connection failure with respect to the time of E-UTRAN 10. Thus, the E-UTRAN 10 and OAM 320 can accurately identify the time of occurrence of the connection failure from the absolute time information and also from the relative time information calculated with reference to the absolute time information.

Second Embodiment

The differences in the second embodiment with respect to the first embodiment are described below.

In the present embodiment, the radio communication unit 210 of the eNB 100 broadcasts the absolute time information indicating the network time. In more details, the radio communication unit 210 sends the absolute time information over the broadcast channel by including it in the system information block (SIB).

(Operation of UE 200)

The differences in the operation of the UE 200 according to the present embodiment with respect to the first embodiment are described below. FIG. 5 is an operation flowchart of the UE 200 according to the present embodiment. In the initial state of FIG. 5, the UE 200 is assumed to be in the connected state (RRC connected state).

In step S201, the radio communication unit 210 receives the Measurement Configuration information according to Immediate MDT from the serving cell. In the present embodiment, the Measurement Configuration information does not include the absolute time information. The Immediate MDT processing unit 261 stores the measurement parameters included in the Measurement Configuration information in the storage unit 250.

In step S202, the radio communication unit 210 receives the broadcasted SIB. In the present invention, the SIB includes the absolute time information.

In step S203, the Immediate MDT processing unit 261 stores the absolute time information included in the SIB in the storage unit 250, and at the same time, starts the relative-time timer 263.

The operation in step S204 and thereafter is the same as the operation in step S103 and thereafter according to the first embodiment.

(Summary of Second Embodiment)

As described above, the E-UTRAN 10 broadcasts the absolute time information, and the UE 200 receives the absolute time information broadcasted from the E-UTRAN 10. Thus, by receiving the absolute time information broadcasted from the base station, the UE 200 can acquire the absolute time information.

[Other Embodiments]

The present invention is explained through each of the above embodiments, but it must not be understood that this invention is limited by the statements and drawings constituting a part of this disclosure. A variety of alternative forms of execution, embodiments, and operation techniques may become clear to those skilled in the art through this disclosure.

In the second embodiment, the UE may skip the use the relative-time timer. Since the absolute time information is broadcasted on one of the SIBs, the UE simply obtain the broadcast absolute time information when the connection failure occurs (S204) and use this absolute time to send to the network or store this absolute time if needed for transmission in the future. This assumes that the periodicity of the broadcasted absolute time is short enough to provide enough granularity in time for use at the network. In this case, the RLF report is based only on the absolute time information broadcasted from the network, and is not include the relative time information.

The present invention may also be applied to Logged MDT in Connected that is Logged MDT of a mode in which the logging process is performed by the UE 200 in a connected state. In this case, the absolute time information will need to be added to new LoggedMeasurementConfiguration message for Logged MDT in Connected, similar to the above-mentioned first embodiment.

The above-mentioned second embodiment can be applied not only to UE 200 in which Immediate MDT is configured, but also to UE 200 in which Immediate MDT is not configured.

Furthermore, in each embodiment described above, a mobile communication system configured based on LTE was explained, but rather than only LTE, the present invention can also be applied to another mobile communication system supporting MDT (for example, W-CDMA).

Thus, it must be understood that the present invention includes various embodiments that are not described herein.

Note that the entire disclosure of U.S. Provisional Application No. 61/389395 (filed on Oct. 4, 2010) is incorporated into the present specification by reference.

INDUSTRIAL APPLICABILITY

As described above, because the mobile communication method, the radio terminal, and the base station according to the present invention can prevent the execution of wrong parameter adjustment by the network, they are useful in radio communication, such as mobile communications.

The invention claimed is:

1. A mobile communication method comprising:
   when a radio terminal detects an occurrence of a connection failure with a network in a radio resource control (RRC) connected state, storing a radio link failure (RLF) report regarding the detected connection failure, separately from minimization of drive test (MDT) measurement data, in the radio terminal;
   when the radio terminal fails an establishment of a RRC connection with the network, storing connection establishment failure information regarding a connection establishment failure, separately from the MDT measurement data, in the radio terminal;
   when the radio terminal establishes a RRC connection with the network and has the RLF report, sending a notification indicating a possibility of sending the RLF report, from the radio terminal to the network; and
   when the radio terminal receives a sending request for the RLF report from the network based on the notification, sending the RLF report containing first time information for identifying a time of occurrence of the connection failure, separately from the MDT measurement data, from the radio terminal to the network,
   wherein the radio terminal is further configured to send the connection establishment failure information containing second time information for identifying a time of the connection establishment failure, to the network.

2. A radio terminal comprising:
   a controller that,
      when the radio terminal detects an occurrence of connection failure with a network, in a radio resource control (RRC) connected state, stores a radio link failure (RLF) report regarding the detected connection failure, separately from minimization of drive test (MDT) measurement data;
      when the radio terminal fails an establishment of a RRC connection with the network, stores connection establishment failure information regarding a connection establishment failure, separately from the MDT measurement data;

when the radio terminal establishes a RRC connection with the network and has the RLF report, sends a notification indicating a possibility of sending the RLF report, to the network; and when the radio terminal receives a sending request for the RLF report from the network based on the notification, sends the RLF report containing first time information for identifying a time of occurrence of the connection failure, separately from the MDT measurement data, to the network, wherein the controller is further configured to send the connection establishment failure information containing second time information for identifying a time of the connection establishment failure, to the network.

3. A processor provided in a radio terminal that:

when the radio terminal detects an occurrence of connection failure with a network, in a radio resource control (RRC) connected state, stores a radio link failure (RLF) report regarding the detected connection failure, separately from minimization of drive test (MDT) measurement data;

when the radio terminal fails an establishment of a RRC connection with the network, stores connection establishment failure information regarding a connection establishment failure, separately from the MDT measurement data;

when the radio terminal establishes a RRC connection with the network and has the RLF report, sends a notification indicating a possibility of sending the RLF report, to the network; and when the radio terminal receives a sending request for the RLF report from the network based on the notification, sends the RLF report containing first time information for identifying a time of occurrence of the connection failure, separately from the MDT measurement data, to the network, wherein the processor is further configured to send the connection establishment failure information containing second time information for identifying a time of the connection establishment failure, to the network.

* * * * *